United States Patent [19]
Holmes

[11] 3,914,176
[45] Oct. 21, 1975

[54] DUAL FILTER ASSEMBLY
[75] Inventor: Donald E. Holmes, Clark Lake, Mich.
[73] Assignee: Clark Equipment Company, Buchanan, Mich.
[22] Filed: May 6, 1974
[21] Appl. No.: 467,162

[52] U.S. Cl. ............... 210/132; 210/232; 210/240; 210/340
[51] Int. Cl.² .......................................... B01D 27/10
[58] Field of Search .......... 210/130, 134, 253, 330, 210/340, 335, 341, 252, 240, 232

[56] References Cited
UNITED STATES PATENTS

| | | | |
|---|---|---|---|
| 535,366 | 3/1895 | Field | 210/253 |
| 1,408,822 | 3/1922 | Mosher | 210/341 |
| 2,076,935 | 4/1937 | Burckhalter | 210/134 X |
| 2,492,704 | 12/1949 | Lentz | 210/340 X |
| 3,154,485 | 10/1964 | Liddell | 210/333 X |
| 3,396,847 | 8/1968 | Englesberg | 210/335 X |
| 3,557,957 | 1/1971 | Baldwin | 210/130 |
| 3,598,243 | 8/1971 | Gutkowski | 210/340 |

Primary Examiner—Theodore A. Granger
Attorney, Agent, or Firm—Ernst H. Ruf

[57] ABSTRACT
A dual filter assembly, including two adjoining and interconnected single filter assemblies with individual filter heads, for filtering a volume of fluid in excess of the capacity of one of the single filter assemblies, wherein each filter head has a fluid inlet passage which, in addition to being in communication with the filter bowl interior, also merges with a radially outwardly extending upper passage, and each filter head has a fluid outlet passage which, in addition to being in communication with the filter bowl interior, also merges with a radially outwardly extending lower passage, with the filter heads being interconnected and adjoined so as to permit sealed communication therebetween via abutting outer ends of the upper and lower radial passages respectively, whereby upon having one each of its dual inlet and outlet passages closed off, the fluid to be filtered, upon entering the open fluid inlet passage, is divided into two fluid portions, one of which is filtered in its associated filter assembly whereas the other fluid portion flows from the inlet passage via the interconnected upper passages into the adjoining filter head and is filtered in its filter assembly, with the clean fluid portion of the one of the filter assemblies which has its outlet passage closed off, flowing via the interconnected lower passages to the other of the filter assemblies wherein the clean fluid portions recombine and exit from the open outlet passage thereof.

8 Claims, 4 Drawing Figures

DUAL FILTER ASSEMBLY

BACKGROUND OF THE INVENTION

1. Field of the Invention

The field of art to which this invention pertains includes that of liquid purification or separation; more specifically, a dual filter assembly including two joined single filter assemblies with individual filter heads for filtering a volume of fluid in excess of the capacity of one of the single filter assemblies.

2. Description of the Prior Art

Filter assemblies, particularly fluid filter assemblies, are widely used in the automotive fluid generally for engine oil filtration and are almost universally used on transmissions and torque converters that are utilized in heavy duty industrial and construction equipment. One general mode of operation of filter assemblies of this type is centripetal, i.e., fluid to be filtered enters through the filter head inlet port, flows downward between the filter shell and the filter element, radially inwardly through the filter media to the center of the annular filter element, then upward and out through the filter head outlet port. Generally, a bypass on relief valve is interposed somewhere in the fluid circuit so as to permit direct communication betwen the inlet port and the port so that the lubrication function can continue in case the filter element should become plugged.

In the prior art, if, for example, in a series of related applications, greater filtering capacity is required in one application than one of the normally used filter assemblies is capable of handling, then generally a larger filter assembly is required in order to accomplish the desired filtering operation. While this is no problem from a technical standpoint, it does, however, represent a proliferation of additional parts, in that larger filtering elements and filter bowls and/or larger filtering heads are required to be stocked in addition to the standard units. In addition, there must be a larger inventory of parts, greater costs are incurred and more storage space is required.

SUMMARY OF THE INVENTION

The dual filter assembly of this invention, which includes two joined single filter assemblies with individual filter heads as well as individual filter bowls and annular filter elements operatively mounted in each of the bowls, solves the previously mentioned problems by permitting the filtering of a volume of fluid in excess of the capacity of one of the single filter assemblies. Each of the adjoining and interconnected filter assemblies has a filter head that includes a fluid inlet passage that merges near one end into a generally annular passage which opens into the filter bowl interior and also merges near another end into a radially outwardly extending upper passage. A filter head fluid outlet passage merges near one end into a generally cylindrical cavity that opens into the filter bowl interior, with the outlet passage and the cylindrical cavity also merging with a radially outwardly extending lower passage.

The dual filter assembly has its two filter heads joined in an aligned back-to-back relation so as to permit sealed communication therebetween via abutting outer ends of the opposed upper and lower passages respectively. The filter element of each of the filter assemblies is mounted in the normal path of fluid flow between the inlet and outlet passages and the interconnected filter heads have one each of its two inlet and outlet passages closed off, with the fluid to be filtered, upon entering the open fluid passage, being divided into two fluid portions. One fluid portion flows from the inlet passage through its associated generally annular passage into the filter bowl interior. The other fluid portion flows from the inlet passage via the interconnected upper passages into the inlet passage of the adjoining filter head and via its annular passage into its filter bowl interior. Each fluid portion is cleaned by flowing through its respective filter element and continues on into its respective cylindrical cavity. The cleaned fluid portion of the one of the filter assemblies which has its outlet passage closed off, flows via the interconnected lower passages to the other of the filter assemblies wherein the cleaned fluid portions recombine and exit from the open outlet passage.

It should be noted that the fluid is not filtered twice but merely that the individual filters are parallel and that the unfiltered fluid is divided upon entering one of the filters and the clean fluid from both of the filters is recombined as it exits from one of the filters. In one hookup mode, one of the interconnected filter heads has both of its inlet and outlet passages closed off while the other filter head has both of its inlet and outlet passages open. In another hookup mode one of the interconnected filter heads has one of its inlet and outlet passages closed off while the other filter head has the corresponding one of its inlet and outlet passages open. Thus, flow couplings can be attached to the inlet and outlet passages of either one of the single filter assemblies, thus permitting connections on either end of the dual filter assemblies. In addition, connections may be made on either side of the dual filter assembly by communicating with the inlet passage of one and the outlet passage of the other of the single filter assemblies. This makes installation and conduit hookup extremely versatile and simple.

In order to permit continued lubrication in the event of a filter blockage, each filter head includes a passageway that interconnects the inlet passage with the generally cylindrical cavity. A valve means within the cylindrical cavity normally closes the passageway that interconnects the inlet passage with the cylindrical cavity, but permits direct communication between the fluid inlet and outlet passsages when the differential pressure across the filter element exceeds a predetermined limit.

Other features and advantages of the invention will become more readily understood by persons skilled in the art when following the detailed description in conjunction with the several drawings.

DESCRIPTION OF THE PREFERRED EMBODIMENTS

Figure 1:
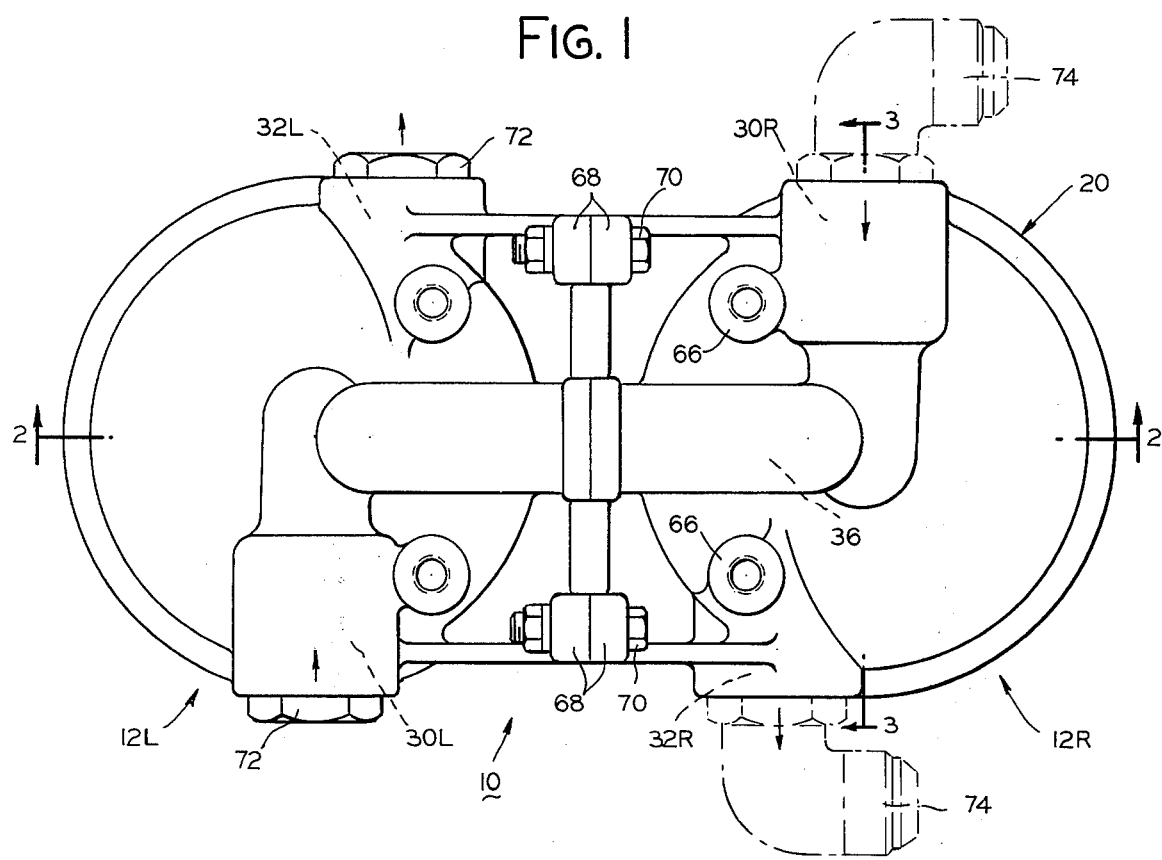
FIG. 1 is a top view of the filter heads used with the dual filter assembly of this invention.
Figure 2:
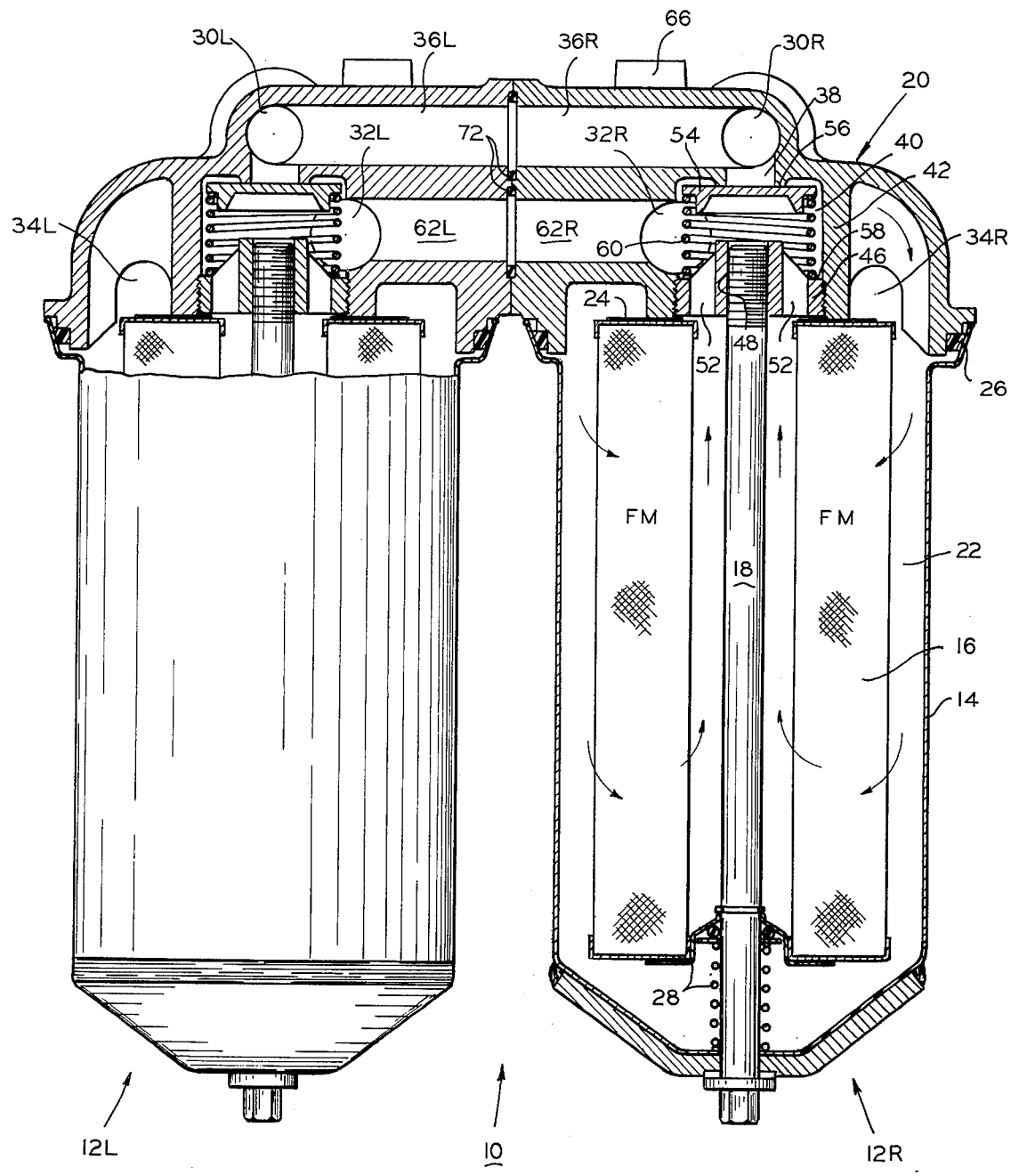
FIG. 2 is a partial, sectional side elevation, taken along line 2—2 of FIG. 1 of the dual filter assembly of this invention.

Referring now the drawings in detail, particularly FIGS. 1 and 2, there is shown a dual fluid filter assembly 10 made up of two single filter assemblies 12R and 12L attached to each other in a back-to-back manner or relationship. Since assemblies 12R and 12L are identical in every respect only one will be described and the suffixes "R" and "L" will be used only when necessary for the operational description thereof.

As best seen in FIG. 2, each filter assembly 12 includes a filter shell or bowl 14 of inverted, U-shaped configuration preferably fashioned from reinforced sheet metal, a unitary annular filter element or cartridge 16, of any well known construction, preferably of the disposable type, operatively mounted within bowl 14, a center or mounting bolt 18 and a filter mounting head or filter mounting means 20. Basically, filter bowl 14, with filter element 16 mounted therein, is bolted to mounting head 20 by means of center bolt 18. A sealing ring or gasket 26 is interposed between the open end of filter bowl 14 and the open end of filter head 20. It should be noted at this time that filter shell 14, filter element 16, its filtering media FM, and the particular element retaining structure within bowl 14, as well as center bolt 18, form no part of the present invention.

Filter mounting head 20 is formed with a radial fluid inlet passage 30 and a parallel but offset fluid outlet passage 32. Inlet and outlet passages 30 and 32 respectively, terminate outwardly on opposite sides of filter head 20. Fluid inlet passage 30 opens near its outer end into a generally annular passage 34 that is concentric with and opens into the interior 22 of bowl 14. In addition, fluid inlet passage 30 merges at its relatively inner end into a radially outwardly extending, generally cylindrical, upper passage 36 that is substantially normal or perpendicular to passage 30.

Figure 3:
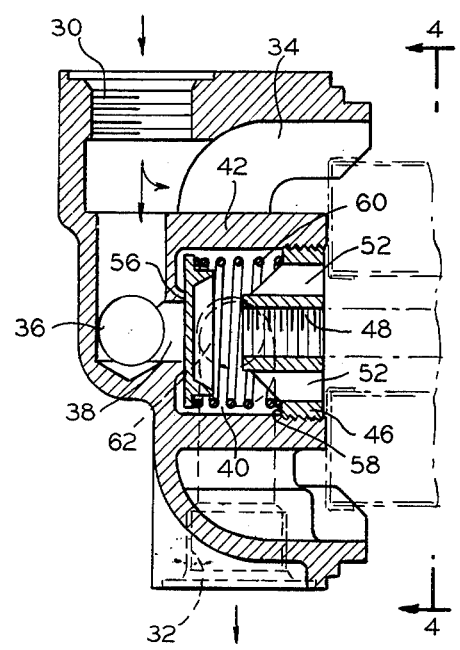
FIG. 3 is a partial, sectional view taken along line 3—3 of FIG. 1, showing details of one of the filter heads of this invention.
Figure 4:
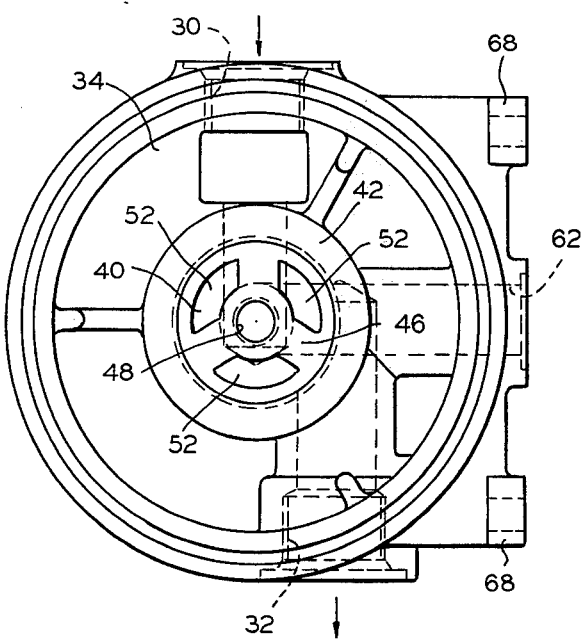
FIG. 4 is an end view of one of the filter heads of this invention, looking in the direction of arrows 4—4 of FIG. 3, showing internal details thereof.

Fluid outlet passage 32 merges at its inner end into a generally cylindrical cavity or passage 40 circumferentially bounded by mounting head wall portion 42. The lower portion of cavity 40 has fixedly received therein a center bolt retainer or securing member 46 having a threaded central opening 48 for receiving the threaded inner end of mounting bolt 18. Retainer member 46 also hsa a plurality of arcuate openings 52 that permit communication between bowl interior 22 and cylindrical cavity 40. Also extending into cylindrical cavity 40 is a short cylindrical passage 38, with passage 38 being in communication with and generally perpendicular to both passages 30 and 36. As best seen in FIGS. 2 and 3, passage 38 into cavity 40 is normally closed by means of a valve member 54 that is normally biased against mounting head annular rim surface 56 by means of a spring 60. Both valve member 54, which is preferably a flat disc-like member and spring 60, which is preferably a coil spring, are located within cavity 40, with spring 60 being retained and located on an annular surface portion 58 of center-bolt retainer member 46 which thus also serves as a spring retainer. Valve member 54 and with spring 60 together comprise a relief or bypass valve 64, the function of which will be described in more detail later.

In addition to the merging of fluid outlet passage 32 into cavity 40, a radially outwardly extending, further generally cylindrical, lower passage 62 merges with and is perpendicular to both passage 32 and cavity 40.

As best seen in FIG. 1, each filter head 20 is also provided with multiple threaded bosses 66 for securing the filter heads to any desired base or mounting structure, such as, for example, an engine or transmission or wherever fluid filtering is desired. In addition, since filter assemblies 12R and 12L are joined in a back-to-back opposed or reversed fashion, each filter head 20 is provided with multiplies of attachment lugs 68 abutting ones of which are joined by nut and bolt assemblies 70.

As best seen in FIGS. 1 and 2, the joining of filter asemblies 12L and 12R permits communication therebetween via axially aligned passages 36 and 32. Sealing rings or gaskets 72 prevent leakages between the adjoining and abutting ends of passages 36R and 36L as well as passages 62R and 62L, respectively.

Filter mounting head inlet and outlet passages 30 and 32 respectively, may either be closed off by plugs 72 and/or provided with flow couplings 74, as will be explained in more detail later.

Prior to describing the operation of dual filter assembly 10 it may be best to describe the operation of one of the single filter assemblies 12. Taking, for example, filter assembly 12R and assuming that upper and lower cylindrical passages 36R and 62R are closed (e.g., plugged at their outer end portions), fluid entering through fluid inlet passage 30 flows via annular passage 34 into bowl 14, around the outer surface of filter element 16, radially through filtering media FM into the hollow center portion of the filter element and then exits therefrom via passages 52 and cylindrical cavity 40 out of fluid outlet passage 32.

As previously noted, filter element 16 and its mounting structure may be of any well known configuration and preferably includes a conventional type of sealing means 24 that permits a sealing relationship between one annular end surface of the filter element and filter head wall portion 42. Further structural elements preferably include filter element locating brackets and biasing means 28 of well known construction.

If filter element 16 should become plugged, the incoming fluid to be filtered, instead of flowing downwardly around filter element 16 will, as the differential pressure across the filtering media increases above a predetermined limit, flow directly inwardly toward the center portion of the filter mounting head via passages 30 and 38. The increased pressure will overcome spring biased valve member 54 of bypass valve 64 and the fluid will flow directly into cylindrical cavity 40 from which it will, in turn, flow into fluid outlet passage 22. It should be noted at this time that filter assemblies 12 may be used singly in the manner previously described, as long as passages 36 and 62 are either not machined (i.e., closed) or plugged. In addition, filter assemblies 12 can also be used singly when passages 30 and 32 are closed, since passage 36 and 62 can serve as inlet and outlet passages, respectively.

However, if greater filtering capacity is required than one filter assembly is capable of handling, two single filter assemblies 12R and 12L are attached to each other in the back-to-back manner shown in FIG. 1. It should be noted that the inlet and outlet passages of filter assembly 12R are provided with flow couplings 74, whereas the inlet and outlet passages of filter assembly 12L are closed off by plugs 72. For example, it may be assumed that each of filter assemblies 12 is capable of filtering 25 gallons per minute (GPM) and that the fluid to be filtered enters inlet passage 30R at a 50 GPM rate. Since each of filter units 12R and 12L is a 25 GPM unit and the fluid flow volume is 50 GPM, half of the fluid flows into filter assembly 12R via annular passage 34 whereas the other half of the fluid flows from inlet passages 30R via abutting and communicating passages 36R and 36L into filter assembly 12L. Filtration in filter assembly 12R is in the previously described manner, with the filter fluid flowing outwardly therefrom through cavity 40 and outlet passage 32R.

The unfiltered fluid entering filter assembly 12L via passage 36L flows via inlet passage 30L (the outer end of which is plugged) into passage 34L and filtration is accomplished in the manner previously described. The filtered fluid flows into cylindrical cavity 40L, but since outlet passage 32L is plugged, the filtered fluid is caused to flow, via lower passages 62L and 62R back into filter assembly 12R. Since passage 62R intersects outlet passage 32R the filtered fluid from the filter assembly 12L also exits through outlet passage 32R. The just-described filtering operational sequence basically sets forth that all of the unfiltered fluid enters one of the single filter assemblies, is divided, with one portion of the fluid being filtered in the one filter assembly while the other portion of the fluid is channeled via passages 36 into the adjacent single filter assembly wherein it is filtered in the same manner and returned via passages 62 to the one filter assembly from whence it exits together with the filtered fluid from the one filter assembly. It should be pointed out for clarity's sake that the fluid is not filtered twice but merely that the filters are parallel and that the unfiltered fluid is divided upon entering one of the filters and the clean fluid from both the filters is recombined as it exits from the one filter. As shown in FIG. 1, in the just-described mode of operation, filter mounting head inlet and outlet passages 30R and 32R are provided with flow couplings 74 whereas inlet and outlet passages 30L and 32L are closed off by means of plugs 72. Thus, the flow couplings are on opposite sides of one of the single filter assemblies.

If so desired, in an alternate operational sequence, filter inlet and outlet passages 30R and 32L are provided with flow couplings 74 whereas outlet passage 32R and inlet passage 30L are both closed off by plugs 72. With this arrangement, (not shown per se) all of the fluid to be filtered again enters into filter assembly 12R and is again split in the manner previously described. However, the fluid filtered in assembly 12R cannot exit through plugged outlet passage 32R but rather flows through passages 62R, 62L and 32L out of filter assembly 12L. The unfiltered fluid entering assembly 12L via passages 36R and 36L is filtered in the manner previously described and will also exit through passage 32L (rather than returning to filter 12R in the manner previously described). In this embodiment it should be noted that flow couplings 74 will be on one side of dual fluid filter assembly 10, i.e., one flow coupling on each of the two single filter assemblies.

The just-described alternate filtering operational sequence basically sets forth that all of the unfiltered fluid enters one of the single filter assemblies, is divided, with one portion of the fluid being filtered in the one filter assembly while the other portion of the fluid is channeled via passages 36 into the adjacent single filter assembly wherein it is filtered in the same manner. The filtered fluid from the one filter assembly is then channeled via passages 62 to the adjacent filter assembly from whence it exits together with the filtered fluid from this adjacent filter assembly.

It should, of course, be understood that it makes no difference, in either of the previously-described filtering operational sequences, whether the fluid flows from left to right or right to left, i.e., whether the fluid enters through inlet passage 30L or 30R, etc. It should also be understood that the incoming fluid need not necessarily be divided equally between the two single filter assemblies. In addition, it should be understood that the fluid inlet and outlet passages are so dimensioned as to allow a fluid flow volume that is at least twice that of each of the filter assembly capacities, i.e., so that the dividing and recombining of the fluid stream can be accomplished without throttling the individual filter assemblies.

The utilization of top-mounted threaded mounting bosses 66, that are parallel with the longitudinal axes of the single filter assemblies, permits the convenient mounting of the filter heads to any desired base or mountinig structure. The use of these mounting bosses permits ready attachment of fluid inlet and outlet conduits onto dual filter assembly 10. For example, flow couplings 74 can be attached to the inlet and outlet passages of either one of single filter assemblies 12, thus permitting connections on either end of the dual filter assembly. In addition, connections may be made on either side of dual filter assembly 10 by communicating with the inlet passage of one and the outlet passage of the other of the single filter assemblies. Therefore, installation and conduit hookup is extremely versatile and simple. In addition, instead of producing single filter assemblies of differing sizes it is much more economical to unite two of the single filter assemblies, in the manner previously described, in order to increase the filtering capacity. This not only results in increased economies but also allows the previously described flexibility in conduit hookup.

From the foregoing, it is believed that those familiar with the art will readily recognize and appreciate the novel concepts and features of the present invention. Obviously, while the invention has been described in relation to only a limited number of embodiments, numerous variations, changes and substitutions of equivalents will present themselves to persons skilled in the art and may be made without necessarily departing from the scope and principles of this invention. For example, this invention is not limited to the use of a center bolt design for the attachment of the filter bowl to the filter head. If desired, a screw-on-type disposable combination filter bowl and element could readily be attached to a modified bolt retainer member or a modified mounting head wall portion. As a result, the embodiments described herein are subject to various modifications, changes and the like, without departing from the scope and spirit of the invention, with the scope thereof being determined solely by reference to the claims appended hereto.

What is claimed is:

1. In combination, a dual filter assembly, including two single and independent filter assemblies joined in opposed back-to-back relation having individual filter heads for single filtering a volume of fluid in excess of the capacity of one of said single filter assemblies, each filter having sealingly secured thereto a cylindrical filter bowl open at one end, as well as an annular filter element operatively mounted in the bowl, said dual filter assembly including:
  a. a fluid inlet passage in each filter head, said inlet passage merging near its outer end into a generally annular passage that is concentric with and opens into the filter bowl interior, said inlet passage also merging at its relatively inner end into an outwardly extending upper passage substantially normal to said inlet passage;
  b. a fluid outlet passage in each filter head, said outlet passage merging near its inner end into a generally cylindrical cavity, bounded by a head wall portion, that opens into the filter bowl interior and is in sealing relationship relative to annular end surface of said filter element, said outlet passage also merging at its relatively inner end with an outwardly extending lower passage substantially normal to both said outlet passage and said cylindrical cavity as well as being parallel and vertically aligned with said upper passage;
  c. a passageway in each filter head, said passageway interconnecting said inlet and upper passages with said cylindrical cavity; and
  d. valve means in the cylindrical cavity of each filter head for normally closing said passageway interconnecting said inlet and upper passages with said cylindrical cavity, said valve means permitting direct communication of said fluid inlet and upper passages with said outlet passage when the differential pressure across the filter element exceeds a predetermined limit;
said dual filter assembly having said two filter heads joined in an opposed back-to-back relation so as to permit sealed communication therebetween via abutting outer ends of said opposed upper and lower passages respectively, said filter element of each of said filter assemblies, being mounted in the normal path of fluid flow between said inlet and outlet passage, said joined filter heads having one each of its dual inlet and outlet passages closed off, with said fluid to be filtered, upon entering said other fluid inlet passage being divided into two portions with one portion of said fluid flowing from said open inlet passage through said associated generally annular passage into said filter bowl interior, with said other portion of said fluid flowing from said inlet passage via said associated upper passage and continuing through the adjoining upper passage of the adjoining filter assembly into its inlet passage and via said annular passage into the filter bowl interior, each fluid portion being cleaned by flowing through its respective filter element and continuing on into its respective filter head cylindrical cavity, with the cleaned fluid portion of the one of said filter assemblies which has its outlet passage closed off, flowing via said adjoining lower passages to the other of said filter assemblies wherein the cleaned fluid portions of both of said assemblies recombine in the outlet passage of the filter assembly having an open outlet passage and exit therefrom whereby several alternate single fluid inlet and outlet connection hookup modes are made possibly by having differing ones of each of said dual inlet and outlet passages respectively, closed off.

2. The dual filter assembly of claim 2 wherein each filter head has its filter bowl secured thereto with a center bolt and each filter head further includes means for retaining said center bolt, said retaining means being fixedly received within said filter head cylindrical cavity, said retaining means further having a central opening for receiving one end of said center bolt and a plurality of arcuate openings that permit communication between said filter bowl interior and said cylindrical cavity.

3. The dual filter assembly of claim 2 wherein said retaining means further includes an annular outer surface portion that serves for retaining and locating at least a portion of said valve means.

4. The dual filter assembly of claim 1 wherein one of said two joined filter heads has both its inlet and outlet passages closed off, while the other of said filter heads has both of its inlet and outlet passages open, with said fluid to be filtered, upon entering the inlet passage of the other of said filter heads, being divided into first and second fluid portions, with said first fluid portion flowing from said open inlet passage through said associated generally annular passage into said other filter bowl interior while said second fluid portion flows from said open inlet passage, via said adjoining upper passages, to the inlet passage of said one filter head and via its annular passage into its filter interior, each of said first and second fluid portions being cleaned by flowing through its respective filter element and continuing on into its respective filter head cylindrical cavity, with said second fluid portion flowing via said adjoining lower passages back to said other filter head wherein said first and second fluid portions recombine and exit from said other filter head outlet passage.

5. The dual filter assembly of claim 1 wherein one of said two joined filter heads has one of its inlet and outlet passages closed off while the other of said filter heads has the corresponding one of its inlet and outlet passages open, with said fluid to be filtered, upon entering the inlet passage of one of said filter heads, being divided into first and second fluid portions, with said first fluid portion flowing from said open inlet passage through its adjoining generally annular passage into its filter bowl interior, while said second fluid portion flows from said open inlet passage, via said adjoining upper passages to the inlet passage of said other filter head and via its annular passage into its filter bowl interior, each of said first and second fluid portions being cleaned by flowing through its respective filter element and continuing on into its respective filter head cylindrical cavity, with said first fluid portion flowing via said adjoining lower passages to said other filter head wherein said first and second fluid portions recombine and exit from said other filter head outlet passage.

6. In combination, two adjoined and interconnected, in a reversed back-to-back relationship, independent single filter assemblies for single filtering a volume of fluid in excess of the capacity of one of said single filter assemblies, each assembly having an individual filter head, a cylindrical filter bowl open at one end, as well as an annular filter element operatively mounted in the bowl, wherein each of said filter heads includes:
  a. a fluid inlet passage in each filter head merging near one end into a generally annular passage that opens into the filter bowl interior and merging near another end into a radially outwardly extending first passage;

b. a fluid outlet passage in each filter head merging near one end into a generally cylindrical cavity, that opens into the filter bowl interior, said outlet passage and said cylindrical cavity also merging with a radially outwardly extending second passage, said first and second passages lying in the same vertical plane;

c. a passageway in each filter head, said passageway interconnecting said inlet and first passageway with said cylindrical cavity; and d. valve means in the cylindrical cavity of each filter head for normally closing said passageway interconnecting said inlet and first passages with said cylindrical cavity, said valve means permitting direct communication of said fluid inlet and first passages with said outlet passage when the differential pressure across the filter element exceeds a predetermined limit;

said filter assemblies having said two filter heads interconnected and adjoined in a reversed back-to-back relationship so as to permit sealed communication therebetween via abutting outer ends of said first and second radial passages respectively, said filter element of each of said filter assemblies being mounted in the normal path of fluid flow between said inlet and outlet passages, said interconnected filter heads having one each of its two inlet and outlet passages closed off, with said fluid to be filtered, upon entering the open fluid inlet passage being divided into two fluid portions with one fluid portion flowing from said inlet passage through said associated generally annular passage into said filter bowl interior, with said other fluid portion flowing from said inlet passage via said interconnected first passages into the inlet passage of said adjoining filter head and via its annular passage into its filter bowl interior, each fluid portion being cleaned by flowing through its respective filter element and continuing on into its respective cylindrical cavity, with the cleaned fluid portion of the one of said filter assemblies which has its outlet passage closed off, flowing via said interconnected second passages to the other of said filter assemblies wherein the cleaned fluid portions recombine and exit from the open outlet passage thereof said dual filter assembly, by having one each of its dual inlet and outlet passages closed off, permitting several alternate single fluid inlet and outlet connection hookup mode variations.

7. The combination of claim 6 wherein one of said interconnected filter heads has both of its inlet and outlet passages closed off and said other filter head has both of its inlet and outlet passages open.

8. The combination of claim 6 wherein one of said interconnected filter heads has one of its inlet and outlet passages closed off while said other filter head has the corresponding one of its inlet and outlet passages open.

* * * * *